United States Patent
Wunderlich

[19]

[11] Patent Number: 6,122,679
[45] Date of Patent: Sep. 19, 2000

[54] MASTER DMA CONTROLLER WITH RE-MAP ENGINE FOR ONLY SPAWNING PROGRAMMING CYCLES TO SLAVE DMA CONTROLLERS WHICH DO NOT MATCH CURRENT PROGRAMMING CYCLE

[75] Inventor: Russ Wunderlich, Turnwater, Wash.

[73] Assignee: Compaq Computer Corporation, Houston, Tex.

[21] Appl. No.: 09/039,172

[22] Filed: Mar. 13, 1998

[51] Int. Cl.$^7$ ................................................. G06F 13/28
[52] U.S. Cl. .............................. 710/23; 710/22; 710/27; 710/260; 707/100; 707/201
[58] Field of Search ............................ 710/22, 23, 27, 710/260, 4; 707/201

[56] References Cited

U.S. PATENT DOCUMENTS

| | | | |
|---|---|---|---|
| 3,344,406 | 9/1967 | Vinal | 340/172.5 |
| 5,371,742 | 12/1994 | Brown et al. | 714/2 |
| 5,590,337 | 12/1996 | Smith | 710/22 |
| 5,630,116 | 5/1997 | Takaya et al. | 707/201 |
| 5,634,073 | 5/1997 | Collins et al. | 710/5 |
| 5,640,570 | 6/1997 | Clair et al. | 710/260 |
| 5,655,151 | 8/1997 | Bowes et al. | 710/22 |
| 5,664,177 | 9/1997 | Lowry | 707/100 |
| 5,838,993 | 11/1998 | Riley et al. | 710/22 |
| 5,903,230 | 5/1999 | Masenas | 341/51 |
| 5,905,912 | 5/1999 | Story et al. | 710/27 |

OTHER PUBLICATIONS

IBM Technical Disclosure Bulletin, vol. 38, No. 02, Feb. 1995, pp. 517–519, Data Transfer Mechanism for Personal Computer Memory Card International Association Interface to Digital Singal Pro.

ISA System Architecture, Third Edition, MindShare, Inc., by Tom Shanley and Don Anderson; Addison–Wesley Publishing Company.

*Primary Examiner*—Thomas C. Lee
*Assistant Examiner*—Tammara Peyton
*Attorney, Agent, or Firm*—Conley, Rose & Tayon, P.C.; Michael F. Heim; Jonathan M. Harris

[57] ABSTRACT

A computer system implementing a distributed direct memory access architecture is disclosed. The computer system includes a re-map engine that includes control logic and a shadow register for each distributed DMA channel. Each shadow register includes 16 bytes of DMA configuration information that mirrors the current programming of the associated distributed DMA channel. When the CPU needs to program one or more DMA channels, the CPU sends a DMA master programming cycle to the control logic in the re-map engine. The re-map control logic compares the configuration data in the master cycle with the contents of the shadow registers and spawns daughter programming cycles to just those distributed channels for which a mismatch condition exists. If a match exists with respect to a particular channel, indicating that the new programming data is no different than the current programming of the channel, the control logic does not spawn a daughter programming cycle to that channel. If the control logic determines that a mismatch condition exists, the control logic updates the contents of the effected shadow register while spawning the daughter cycle to the distributed channel to be reprogrammed. By spawning only those daughter programming cycles necessary to actually reprogram the DMA system, the distributed DMA system of the present invention requires less bus traffic and thus is more efficient.

21 Claims, 3 Drawing Sheets

MASTER DMA CONTROLLER WITH RE-MAP ENGINE FOR ONLY SPAWNING PROGRAMMING CYCLES TO SLAVE DMA CONTROLLERS WHICH DO NOT MATCH CURRENT PROGRAMMING CYCLE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to computer systems with direct memory access (DMA) and more particularly to distributed DMA. Still more particularly, the present invention relates to checking for DMA programming cycles that include configuration information that has not changed since the last programming cycles.

2. Background of the Invention

A personal computer (PC) includes numerous electronics components interconnected by a network of "busses." A bus is a collection of digital signal lines over which data, addresses, and control information is transferred from one device connected to the bus to another device on the same bus. A typical PC includes a microprocessor (CPU), memory, and a variety of peripheral devices that may be coupled to the CPU and memory by way of one or more busses. These peripheral devices may include a floppy drive, audio card, and modem, to name a few.

Typically, many devices in a PC require access to memory for storing (referred to as a "write" transaction) and retrieving data (a "read" transaction). The CPU thus runs read and write cycles to memory. The CPU may also read data from memory and then write that data to another device in the computer system. As PC's have become increasingly more sophisticated with additional peripheral devices, the burden on the CPU correspondingly increased. Not only did the CPU run cycles to memory for its own purposes, but the CPU was often called upon to retrieve data from memory on behalf of a peripheral device.

To alleviate the burden on the CPU, PC's were provided with the ability to perform "direct memory accesses" (DMA). A DMA cycle permits a peripheral device to write data to or read data from memory with much less CPU involvement than previously required. When using DMA, the CPU must still initiate the data transfer, but the actual data transfer is handled exclusively by a DMA controller, thereby freeing up the CPU to perform other tasks while the data transfer is taking place. After the DMA controller completes the data transfer, the peripheral device interrupts the CPU to indicate the transfer has completed. DMA transfers are often referred to as "fly-by" operations because the data is passed between the peripheral device and memory in a single DMA cycle, rather than two cycles if the CPU was to perform the transfer (a read of the data in one cycle followed by a write to the destination device in a subsequent cycle).

Early PC's included one DMA controller that provided four channels (referred to as channels 0–3) where each DMA channel could be used by a separate peripheral device to handle data transfers with memory. A second DMA controller was added to provide additional DMA channels in a cascaded arrangement. The two DMA controllers were cascaded together, one of the DMA controllers was designated as having channels 0–3 and the other controller had channels 4–7. Channels 0–3 were used for byte (8 bits) transfers and channels 5–7 were used for word (16 bit) transfers. Channel 4 was used for cascading the two controllers together and, therefore, was not available for normal DMA data transfers. The word-wide DMA controller was sometimes referred to as the "primary" or "master" DMA controller, while the byte-wide DMA controller was referred to as the "secondary" or "slave" DMA controller. DMA systems based on this architecture are referred to as "legacy" DMA systems.

The Industry Standard Architecture (ISA) bus and the Extended Industry Standard Architecture (EISA) bus are busses commonly found in many PC's. These busses include signals for performing DMA operations. A peripheral device connected to the ISA bus may request a DMA operation by providing a DMA request signal (DRQ*, where * indicates the channel number) over the ISA bus to the DMA controller. In response to a DRQ signal, the DMA controller will provide a DMA acknowledge (DACK*) signal to the peripheral device when the DMA controller has been granted the ISA bus and is ready to perform the operation. The DMA controller then accesses the peripheral to move data over the ISA bus and between the peripheral and memory. However, since the PCI bus does not incorporate the ISA DMA signals, the ISA DMA devices cannot be placed on these busses.

The PCI is a popular bus because of its performance is generally superior to that of the ISA bus. As such, it is desirable to connect many of the ISA peripherals directly to the PCI bus instead of the ISA bus. The incompatibility between the ISA DMA controller architecture and the PCI bus prevents the joining of these components.

In certain systems, such as portable computers, the limited space requirements allow only one expansion bus to be supported. If only the PCI bus is provided and the ISA bus is not, then ISA DMA compatibility is not directly supported. One method of supporting the ISA DMA operations is to include the DMA controllers in a single PCI device. However, all DMA devices then must connect to this single PCI device, so essentially the ISA bus must be present. Other alternatives are also possible, but for various reasons not desirable.

A solution to these problems was provided by distributing the DMA controllers throughout the PC. An exemplary distributed DMA (DDMA) architecture is described in copending application serial number 08/__, entitled "Method of Having More Than Seven Channels in a Distributed DMA Architecture," assigned to Compaq Computer Corp. In that disclosure, the DDMA architecture generally includes a DMA master and at least one DMA slave channel. Each DMA slave channel provides the functionality of one channel of a conventional DMA controller. The DMA slave channels may be isolated from each other so that they can be individually coupled with particular peripheral devices requiring DMA transfers. Integrating DMA slave channels with the peripherals provides a more tightly integrated DMA architecture in which DMA requests signaled over a bus are unnecessary.

In either a conventional or distributed DMA architecture, the CPU or other programming device must configure each DMA channel before the DMA transfer can begin. Accordingly, each DMA channel includes a number of registers through which the CPU can program the channels. Some of these registers include bits corresponding to different DMA channels. For example, the Slave DMA Control Mask Register is an eight bit register as defined in Table I below.

TABLE I

| | Slave DMA Control Mask Register | | | | | | | |
|---|---|---|---|---|---|---|---|---|
| I/O Port | Bit 7 | 6 | 5 | 4 | 3 | 2 | 1 | 0 |
| 000Fh | | not used | | | Ch. 3 mask bit | Ch. 2 mask bit | Ch. 1 mask bit | Ch. 0 mask bit |

As shown, bits 3–0 of the Slave DMA Control Mask Register each represent the mask bit for a different channel. Bit 3, for example, represents the mask bit for channel 3 while bit 0 represents the mask bit for channel 0. Each DMA configuration register is updated by re-writing the entire contents of that register. Thus, if it is desired to only change the channel 2 mask bit (bit 2), the entire eight bits must be rewritten. As such, the other seven bits that do not change must be rewritten, but without changing the status of those bits. Other DMA registers, such as the Mask DMA Control Register for channels 4–7, and the Master DMA General Mask Register also include bits defined for specific channels.

A distributed DMA architecture generally includes logic for receiving the DMA programming instructions from the CPU, analyzing the instructions, and spawning "daughter cycles" to the distributed DMA controllers implicated by the programming instruction. A daughter cycle refers to a programming cycle to one of the distributed DMA controllers in response to a legacy DMA cycle from the CPU. A problem with this technique is that, in the case of programming cycles to configure DMA registers such as the Slave DMA Control Mask Register, the logic that receives the DMA programming instruction from the CPU will spawn daughter cycles to all four slave distributed DMA channels, including the channels for which the CPU is not attempting to reprogram with different data. If the CPU issues a DMA programming cycle to change the channel 3 mask reset bit (bit 3) in the Slave DMA Control Mask Register, the logic receiving that programming cycle will spawn daughter cycles to the distributed DMA controller defined for channel 3, as well as channels 0–2 even though the programming for those channels have not actually changed.

The daughter cycles typically run on a bus, such as a PCI bus, and require a certain amount of time to run. The daughter cycles to channels that have not actually been reconfigured by the CPU are unnecessary. Thus, for the foregoing reasons, a distributed DMA architecture that only spawns those daughter cycles that actually contain new configuration data would be advantageous. A computer system with such an improved distributed DMA architecture would greatly improve overall system performance as fewer daughter cycles would run on the bus. Unfortunately, to date, no such computer system is known that provides this advantage.

SUMMARY OF THE INVENTION

Accordingly, there is provided herein a computer system implementing a distributed direct memory access architecture. In accordance with the preferred embodiment, the computer system only spawns daughter DMA programming cycles to those distributed DMA channels (controllers) that actually require reprogramming by a CPU or other DMA programming device. The computer system advantageously does not spawn programming cycles to those distributed channels for which the CPU has generated programming cycles that include data that is no different than the current programming of the channels. By spawning only those daughter programming cycles necessary to actually reprogram the DMA system, the distributed DMA system of the present invention requires less bus traffic and thus is more efficient.

In accordance with a preferred embodiment of the invention, the computer system includes a re-map engine preferably included as part of a bridge logic device. The re-map engine includes control logic and a shadow register for each distributed DMA channel. Preferably the re-map engine includes seven shadow registers, one each for DMA channels 0–3 and 5–7. Channel 4 is used for cascading and does require a shadow register. Each shadow register includes 16 bytes of DMA configuration information that mirrors the current programming of the associated distributed DMA channel. The control logic can read and write to the shadow registers.

When the CPU needs to program one or more DMA channels, the CPU sends a DMA master programming cycle to the control logic in the re-map engine. The re-map control logic compares the configuration data in the master cycle with the contents of the shadow registers and spawns daughter programming cycles to just those distributed channels for which a mismatch condition exists. A mismatch condition indicates that the CPU has provided new and different programming data for that channel. If a match exists with respect to a particular channel, indicating that the new programming data is no different than the current programming of the channel, the control logic does not spawn a daughter programming cycle to that channel. If the control logic determines that a mismatch condition exists, the control logic updates the contents of the effected shadow register while spawning the daughter cycle to the distributed channel to be reprogrammed.

Thus, the present invention comprises a combination of features and advantages that enable it to substantially advance the art by permitting a distributed DMA architecture to operate more efficiently. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENTS

Figure 1:
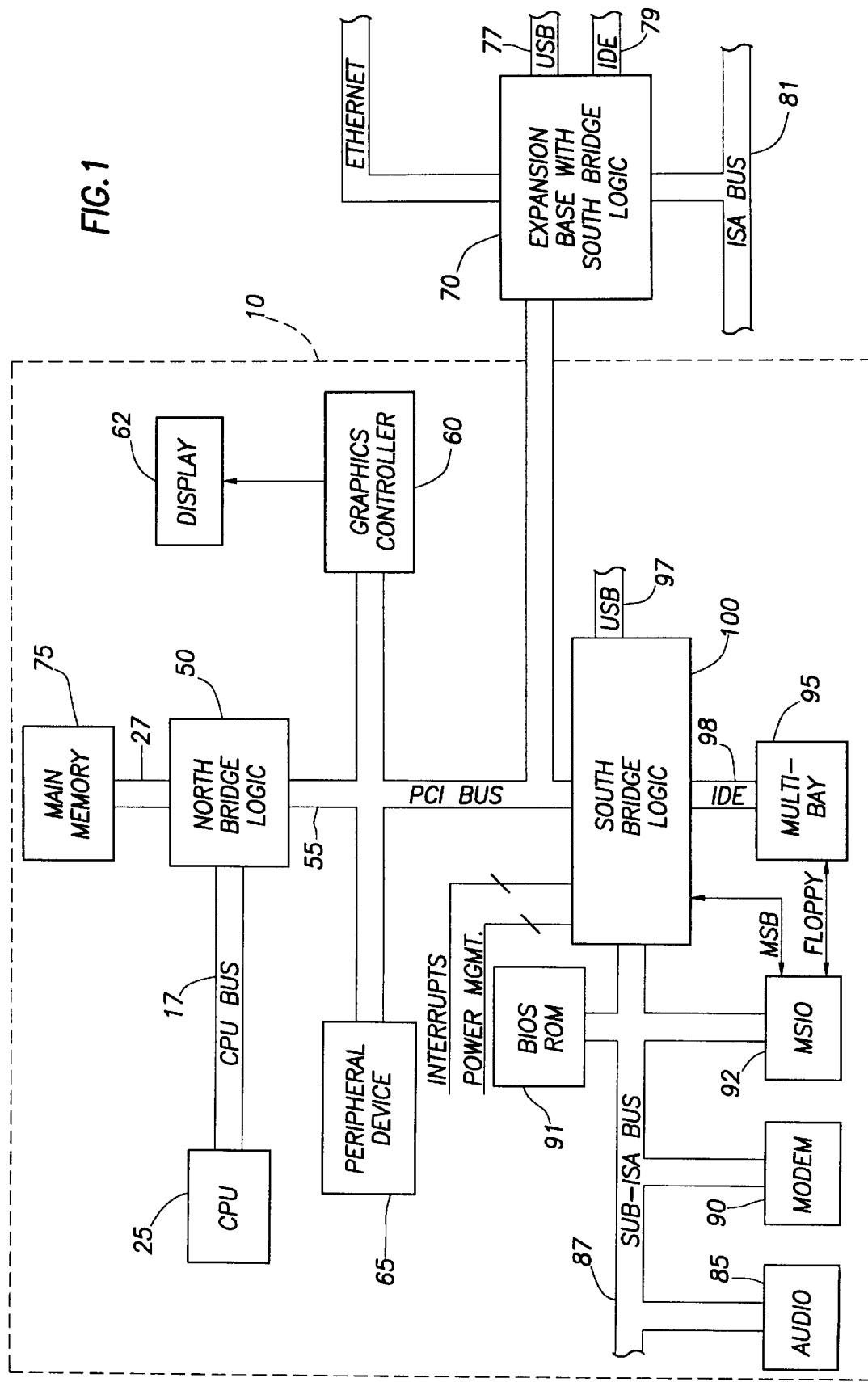
FIG. 1 is a block diagram of a portable computer system constructed in accordance with the preferred embodiment of the present invention with an improved bridge logic device.
Figure 2:
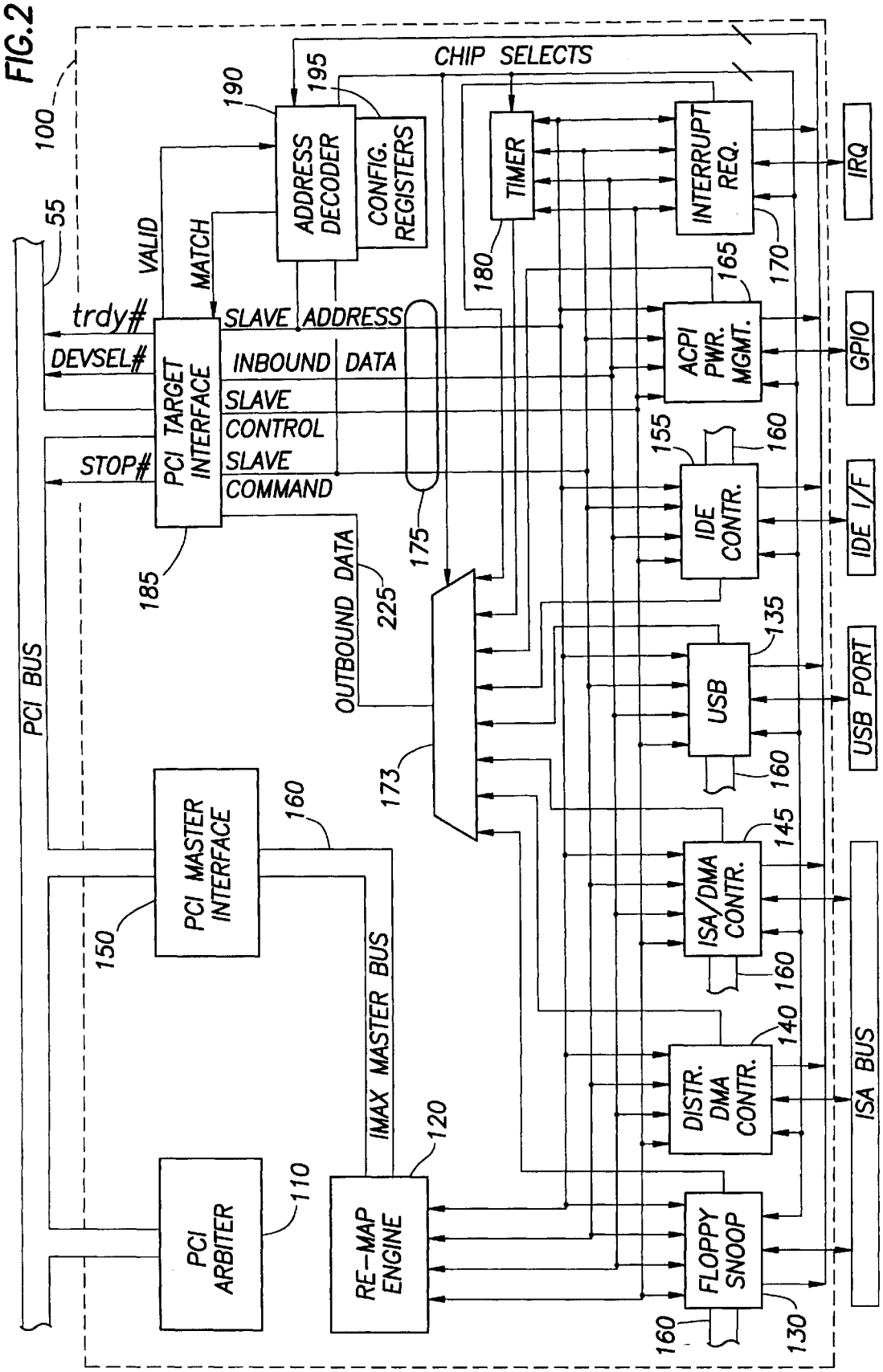
FIG. 2 is a block diagram of the bridge logic device of FIG. 1 constructed in accordance with the preferred embodiment and including a remap engine and distributed DMA controller.

Referring now to FIG. 1, a computer system 10 constructed in accordance with the preferred embodiment generally includes a processor or CPU 25 coupled to a main memory array 75 and a variety of other peripheral computer system components through an integrated bridge logic device 50. As depicted in FIG. 2, the bridge logic 50 sometimes is referred to as a "North bridge" because it is shown at the upper end of the drawing. The CPU preferably couples to bridge logic 50 via a CPU bus 17, or the bridge logic 50 may be integrated into the CPU 25. The CPU 25 may comprise, for example, a Pentium® II microprocessor. It should be understood, however, that other alternative types of microprocessors could be employed. Further, an embodiment of computer system 10 may include multiple processors, with each processor coupled through the CPU bus 17 to the North bridge 50.

The main memory array 75 preferably couples to the North bridge 50 through a memory bus 27, and the North bridge 50 preferably includes a memory control unit (not shown) that controls transactions to the main memory 75 by asserting the necessary control signals during memory accesses. The main memory 75 functions as the working memory for the CPU 25 and generally includes a conventional memory device or array of memory devices in which application programs and data are stored. The main memory array may comprise any suitable type of memory such as dynamic random access memory ("DRAM") or any of the various types of DRAM devices such as synchronous dynamic random access memory ("SDRAM") or extended data out dynamic random access memory (EDO DRAM).

The computer system 10 also preferably includes a graphics controller 60 that couples to the bridge logic 50 via an expansion bus 55 as shown in FIG. 1. Alternatively, the graphics controller 60 may couple to bridge logic 50 through an Advanced Graphics Port ("AGP") bus (not specifically shown). As one skilled in the art will understand, the graphics controller 60 controls the rendering of text and images on a display device 62. The graphics controller 60 may embody a typical graphics accelerator generally known in the art to render three-dimensional data structures on display 62. These data structures can be effectively shifted into and out of main memory 75 via the expansion bus and bridge logic 50. The graphics controller 60 therefore may be a master of the expansion bus (including either PCI or AGP bus) enabling the graphics controller 60 to request and receive access to a target interface within the bridge logic unit 50, including the memory control unit. This mastership capability permits the graphics controller 60 to access main memory 75 without the assistance of the CPU 25. A dedicated graphics bus accommodates rapid retrieval of data from main memory 75. As will be apparent to one skilled in the art, the bridge logic 50 includes a PCI interface to permit master cycles to be initiated and received by bridge logic 50. If an AGP bus is included in the system, the bridge logic 50 also includes an interface for initiating and receiving cycles to and from components on the AGP bus. The display 62 comprises any suitable electronic display device upon which an image or text can be represented. A suitable display device may include, for example, a cathode ray tube ("CRT"), a liquid crystal display ("LCD"), a thin film transistor ("TFT"), a virtual retinal display ("VRD"), or any other type of suitable display device for a computer system.

In the preferred embodiment, the expansion bus 55 comprises a Peripheral Component Interconnect (PCI) bus. The present invention, however, is not limited to any particular type of expansion bus, and thus various busses may be used including a high speed (66 MHz or faster) PCI bus. In the preferred embodiment, a plurality of PCI peripheral devices reside on the PCI bus 55. The PCI devices may include any of a variety of peripheral devices such as, for example, network interface cards (NIC's), video accelerators, audio cards, hard or floppy disk drives, PCMCIA drives, Small Computer Systems Interface ("SCSI") adapters and telephony cards. Although only one PCI peripheral device 65 is depicted in FIG. 1, it should be recognized that computer system 10 may include any number of PCI devices as desired.

The computer system 10 may represent a desktop computer system or, as shown in FIG. 1, a laptop computer that can be connected to an expansion base 70 via the PCI bus 55. The present invention also may be used with a work station, server, or handheld computer. In addition and as mentioned above, computer system 10 can be implemented with respect to the particular bus architectures shown in FIG. 1 (i.e., PCI bus), or other bus architectures, as desired. The embodiment described herein, however, assumes bus 55 represents a PCI bus, as shown in FIG. 1, and thus the following discussion will focus on configuring the present invention for that embodiment. Further, CPU 25 preferably comprises a Pentium® II processor and thus CPU bus 17 represents a Pentium II bus®. These bus protocols and the terminology used with respect to these protocols are well known to those of ordinary skill in the art. If a more thorough understanding of the PCI, or Pentium® II bus is desired, reference should be made to the *PCI Local Bus Specification* (1995), and *Intel P6 External Bus Specification*. If an AGP bus also is used in the computer system, reference may be made to the *Accelerated Graphics Port Interface Specification* (Intel, 1996).

Referring still to FIG. 1, another bridge logic device 100 also preferably connects to expansion bus 55. This bridge logic device 100 (which sometimes is referred to a "South bridge") couples or "bridges" the primary expansion bus 55 to other secondary expansion busses. These other secondary expansion busses may include an ISA (Industry Standard Architecture) bus, a sub-ISA bus, a USB (Universal Serial Bus), an IDE bus, an IEEE 1394 standard (or "fire wire") bus, or any of a variety of other busses that are available or may become available in the future. In the preferred embodiment of FIG. 1, the South bridge logic 100 couples to a sub-ISA bus 87, a USB bus 97 and an IDE bus 98. As will be apparent to one skilled in this art, various peripheral devices may be coupled to each of these busses. Thus, as shown in the preferred embodiment of FIG. 1, an MSIO (Mobile Super I/O) chip 92 connects to the sub-ISA bus, as does an audio card 85, modem 90 and BIOS ROM 91. Similarly, according to the preferred embodiment, a multi-bay configuration couples to the IDE bus 98 and to the MSIO 92. The multi-bay configuration preferably includes three independent bays connected in any master/slave, primary/secondary configuration supporting hot-plugging of IDE devices in the bays. As one skilled in the art will understand various IDE devices are available including CD ROM drives, floppy drives, tape drives, and the like. The USB 97 supports various peripherals, especially video peripherals such as video cameras for teleconferencing purposes. In addition to the busses discussed above, the South bridge also preferably connects to interrupt signal lines, power management signal lines, and a MSB (MSIO Serial Bus).

As noted above, the computer system 10 preferably comprises a laptop computer. To facilitate use of the computer system 10 within a traditional desktop environment, an expansion base 70 preferably is available for connecting the laptop computer system to additional peripheral devices and to a computer network via an Ethernet bus. The expansion base may include any type of configuration, including a port replicator or docking station. The present invention envisions, however, that the expansion base also includes a South bridge logic (not shown specifically) for coupling components on the PCI bus to other components coupled to the expansion base. Thus, as shown in FIG. 1, a South bridge logic device within the expansion base 70 couples the PCI bus to various expansion busses including an ISA bus 81, USB 77 and IDE bus 79. The following discussion focuses on the architecture of the South bridge logic 100. This same architecture may be used (with some minor modifications), if desired, for the South bridge logic within the expansion base 70. Alternatively, the present invention also may be implemented by using a prior art South bridge device in the expansion base 70.

Referring now to FIG. 2, the South bridge logic 100 constructed in accordance with the preferred embodiment comprises a PCI target interface 185, a PCI master interface 150, a PCI arbiter 110, a plurality of various target devices, a PCI inbound target bus 175 and outbound target bus 225 coupling a PCI target interface 185 to internal IMAX targets, and an IMAX master bus 160 coupling the internal master devices to the PCI master interface 150. The IMAX target devices integrated in the South bridge 100 preferably include a re-map engine 120, floppy snoop logic 130, USB controller 135, distributed DMA controller 140, ISA/DMA controller 145, IDE controller 155, ACPI/power management logic 165, interrupt controller 170, and internal timer 180. Except for the re-map engine 120 and internal timer 180 and floppy snoop logic 130, each of these targets functions as an interface to an external component or bus. Each of these targets couples to both the inbound IMAX target bus 175 and to the outbound IMAX target bus 225. Furthermore, the re-map engine 120, floppy snoop 130, ISA/DMA controller 145, USB controller 135 and IDE controller 155 all preferably function as IMAX masters, and thus also couple to the IMAX master bus 160, as shown in FIG. 2. For master read cycles to the expansion bus, the inbound IMAX bus 175 preferably is used as the bus providing the read data from the PCI bus to the internal IMAX master.

The PCI target interface 185 monitors PCI bus cycles and determines when a valid cycle has been run on the PCI bus. In the preferred embodiment, the PCI target interface 185 couples to an internal address decoder 190 and configuration registers 195. The configuration registers 195 are used to determine if a target is within the South bridge or whether the address is located on the IDE or USB bus. The PCI target interface 185 preferably provides an output signal (VALID) to the address decoder 190 indicating the detection of a valid PCI cycle. When the address decoder determines that a PCI address corresponds to an address internal to the South bridge, or to an address on the IDE bus or USB bus, the address decoder 190 provides a MATCH signal to the PCI target interface 185. The PCI target interface 185 also couples to the IMAX inbound target bus 175 to transmit inbound address, data, control and command signals to IMAX targets 120, 130, 140, 135, 145, 155, 165, 170, and 180. Although separate lines are used to denote slave command and slave control signals in FIG. 2, one skilled in the art will understand that both control signals and command signals may be grouped together as control signals, in accordance with normal convention. The PCI target interface 185 also couples to an IMAX outbound target bus 225 that supplies data from internal targets during PCI read cycles.

Each of the internal targets within the South bridge 100 is responsible for posting write data at the rate for which it is designed, and for supplying read data within PCI latency requirements. As will be understood by one skilled in the art, a PCI master starts a PCI cycle by asserting FRAME# on the appropriate PCI bus line. The PCI bus is a multiplexed address and data bus, and thus the address and data are transmitted on the same 32 bus lines, defined as AD[31:0]. During PCI cycles, the address is transmitted first during an "address phase," followed by the data during the "data phase." The PCI bus includes a clock line, PCICLK for synchronizing signals on the PCI bus. The first clock edge on which FRAME# is asserted defines the address phase, and the PCI address and associated bus control signals are latched on the same rising edge of the PCICLK signal. The data phase begins when the target asserts TRDY# and the master asserts IRDY#, indicating that both target and master are ready for the data transfer.

As one skilled in the art will understand, the PCI bus 55 is capable of transferring data between masters and targets in bursts. A master indicates a desire to perform a burst transaction by holding FRAME# asserted. In the preferred embodiment, the PCI target interface 185 supports burst cycles for various internal targets when the interface can remain PCI compliant. In the case of transactions to the ISA controller 145, for example, the PCI target interface 185 does not support burst cycles. Thus, if the PCI master holds FRAME# asserted in an attempt to burst to the ISA bus, the PCI target interface 185 accepts the first data transfer, and then terminates the cycle by asserting the stop (STOP#) signal on the PCI bus 55. The PCI target interface 185 does not accept burst cycles to the ISA bus because it takes longer than 8 PCICLK clock cycles (the PCI specification requirement) to run most cycles on the ISA bus. Thus, the latency caused by the ISA bus would make the South bridge non-PCI-compliant.

The PCI target interface asserts DEVSEL# positively or subtractively to claim a PCI transaction. When the PCI target interface 185 asserts DEVSEL#, it does not negate DEVSEL# until the transaction ends on the PCI bus 55. The end of the bus transaction is indicated by having FRAME# negated, IRDY# asserted, and either TRDY# and/or STOP# asserted. The assertion of TRDY# indicates the last data transfer was accepted, whereas the assertion of STOP# indicates that the cycle was not completed and should be retried later.

With respect to the internal IMAX targets, the PCI target interface asserts various control signals to orchestrate the transfer of data between the internal targets and the masters on the PCI bus. The various IMAX signals between the PCI target interface 185 and the internal IMAX targets will be discussed in detail below.

The address decoder 190 couples to the IMAX target bus 175 and to the configuration registers 195. The address decoder preferably conducts positive decoding of PCI cycles. In addition, in the preferred embodiment the PCI target interface 185 also operates as the subtractive decode agent for the PCI bus. Thus, the PCI target interface 185 claims a PCI cycle by asserting DEVSEL# on the PCI bus 55 when no other PCI device has responded to a PCI cycle by the subtractive decode phase. These cycles then are passed by the target interface 185 to the ISA bus via the ISA controller 145. Alternatively, the South bridge device in the expansion base 70 may act as the subtractive decode agent for the PCI bus.

Referring still to FIG. 2, the address decoder 190 couples to the PCI target interface 185 through a pair of control signal lines identified herein as VALID and MATCH. The VALID signal line transmits a signal from the PCI target interface 185 indicating if the PCI signals on the slave address lines comprise valid PCI signals for decoding by address decoder 190. The MATCH signal line transmits a signal from the address decoder 190 to the target interface 185 indicating if the PCI address value matches an address located in the South bridge or on one of the secondary expansion busses coupled to the South bridge, such as the USB bus or IDE bus. The address decoder 190 also produces a number of chip select output signals that are provided to each of the internal IMAX targets and to a multiplexer 173. The chip selects identify which of the IMAX internal targets are being addressed by the external PCI master. The address decoder 190 is closely linked to a set of configuration registers 195. The configuration registers 195 preferably include an Internal I/O Positive Decode Enable Configuration Register that, among other things, indicates if the South bridge 100 is responsible for decoding I/O cycles to an internal South bridge register. In the preferred embodiment, the appropriate bit is set in this register causing the address decoder 190 to decode I/O cycles to internal South bridge devices, while the same register bit is reset in the South bridge in the expansion base 70 (FIG. 2). Thus, in the preferred embodiment, the South bridge 100 exclusively decodes cycles to unique internal I/O register addresses.

The PCI Master interface 150 executes PCI cycles on behalf of ISA bus master 145, the re-map engine 120, floppy snoop logic 130, USB master 135 and IDE master 155. As a PCI master, the PCI master interface 150 runs memory and I/O read and write cycles on the PCI bus. The PCI master interface 150 also preferably runs memory read line commands when filling ISA/DMA, IDE and USB read line buffers. Thus, the PCI master interface 150 asserts standard PCI protocol signals on the PCI bus 55, including multiplexed address and data signals. The PCI master interface 150 translates IMAX master cycles from the IMAX masters to PCI cycles.

In the preferred embodiment, the PCI master interface 150 includes internal IMAX arbiter logic that arbitrates mastership of the IMAX master bus 160. Although any arbitration scheme may be used, the preferred embodiment implements a least recently used (LRU) arbitration scheme for awarding mastership of the IMAX master bus 160. Once the internal IMAX arbiter unit arbitrates mastership of the IMAX master bus, the PCI master interface 150 issues control signals selecting a particular master. Although not shown specifically in FIG. 2, each of the IMAX masters indicate a request for mastership of the IMAX master bus 160 by asserting a imReq signal to the PCI master interface 150. The PCI master interface 150 awards mastership by returning an imGnt signal to the IMAX awarded mastership. The IMAX master bus 160 couples each of the internal masters to the PCI master interface 150. Preferably, the IMAX master bus includes address, data and control lines that are common to each of the masters. Additional details regarding the common master interface for South bridge 100 may be obtained from a commonly assigned and co-pending patent application entitled, "Computer System With Bridge Logic That Includes An Internal Modular Expansion Bus And A Common Master Interface For Internal Master Devices."

The PCI arbiter 110 couples to the PCI bus 55 and receives requests from the various PCI masters on the PCI bus (including PCI master interface 150). The PCI arbiter selects one of the requesting masters and assigns the PCI cycle to that master according to known techniques. In the preferred embodiment, the PCI arbiter 110 selects a master from multiple requesting masters based upon a least recently used (LRU) arbitration scheme. Based on this protocol, after a master is granted mastership of the bus 55, the bus is re-arbitrated and the current master is put on the bottom of the priority stack. Other arbitration may be used instead of the LRU algorithm if desired without departing from the principles of the present invention.

Referring still to FIG. 2, each of the target devices included in the preferred embodiment will now be briefly described. One skilled in the art will understand, however, that the present invention is not limited to the choice of targets included in the bridge logic device, and that various targets may be used as required to meet the needs and requirements of the computer system.

The IDE controller 155 operates as both a master and as a target within the South bridge 100. Thus IDE controller 155 couples to both the IMAX master bus 160 and the IMAX target busses 175 and 225. The IDE controller 155 preferably comprises a dual mode controller that couples to the IDE interface for the IDE bus. Similarly, the USB controller 135 couples to the USB port on the computer system 10. The USB controller 135 preferably operates as both a master and as a target and thus couples to both the IMAX master bus 160 and to the IMAX target busses 175 and 225.

Referring now to FIG. 2, the floppy snoop logic 130 operates as both a South bridge master and target. The floppy snoop logic enables a floppy drive in an expansion base to be connected to a laptop using fewer signal lines than otherwise required. Thus, floppy snoop 130 couples to the IMAX master bus 160 and to the IMAX target busses 175 and 225. In addition, the floppy snoop logic 130 also couples to the floppy drive through the ISA bus as shown in FIG. 2. When a PCI write cycle is made to a floppy address that is shadowed in the expansion base 70, the PCI target interface will cause a retry cycle to be issued to the PCI master that initiated the cycle to start a delayed transaction. The floppy snoop then initiates the floppy write cycle on the PCI bus through the PCI master interface 150 to shadowed floppy registers in the expansion base 70. At the same time, the floppy snoop logic 130 also runs a write cycle to the MSIO 92 on the sub-ISA bus 87. When the external PCI master retries the write cycle, the snoop logic completes the delayed transaction.

Referring again to FIG. 2, the ACPI/power management logic 165 preferably operates as a slave or target within the South bridge 100, and couples externally to a 16 bit General Purpose I/O lines. In accordance with the preferred embodiment, the ACPI/power management logic 165 conforms to the Advanced Configuration and Power Interface Specification (ACPI). The ACPI/power management logic preferably supports five reduced power states, including Device Idle, System Idle, Global Standby, System Standby, and Hibernation. A more complete description of ACPI may be found in *ACPI Design Specification* (Microsoft/Intel/Toshiba). The South bridge 100 preferably provides 16 general-purpose I/O signals for various power management functions. These signals are accessed in the power management I/O indexed register space.

The interrupt controller 170 preferably controls interrupt requests from the South bridge 100 to the CPU. In the preferred embodiment, the interrupt controller includes two separate controllers, one of which is the master and one of which is the slave. The INT output of the slave controller is cascaded into the IRQ2 input of the master controller. The master controller may be programmed in the fully nested mode to permit the slave controller to send the correct interrupt vector back to the CPU identifying the source of the interrupt. In the preferred embodiment, both master and slave interrupt controllers comprise INTEL 8259, compatible controllers. Further, according to the preferred embodiment, any outstanding PCI cycles to secondary I/O busses (such as ISA, PCMCIA, etc.) must be completed before write cycles are posted to the interrupt controller.

The internal timer 180 preferably operates as an IMAX target and thus couples to IMAX target busses 175 and 225. The timer 180 preferably comprises a programmable interval timer, implemented as an INTEL device 8254 compatible devices. Preferably, the timer 180 provides three counter output signals, identified as Counter 0, and Counter 2. The Counter 0 output signal provides a system timer interrupt for time-of-day, floppy time-out, and other system functions. The Counter 0 output of timer 180 connects to IRQ[0] of the interrupt controller 170. Counter 2 generates a tone for system speakers.

Referring again to FIG. 2, each of the internal IMAX targets provides output data for read cycles on an outbound data bus. The outbound data bus from each target preferably connects to a multiplexer 173. One of these outbound data busses from the IMAX targets is selected based upon the value of the chip selects signal asserted by the address decoder 190. The selected outbound data values are then coupled via the outbound data bus to the PCI target interface 185.

According to the preferred embodiment, the target IMAX bus 175 comprises a high speed, 32-bit, internal bus. The target IMAX bus functions as the primary means of communication between internal target devices 135, 145, 180 (for example) and the internal expansion bus target interface 185. By standardizing on a particular internal bus protocol for the South bridge, much of the South bridge ASIC may be re-used in future design efforts. In addition, the manufacturers of peripheral devices can design devices compatible with the IMAX protocol to insure that their designs will remain compatible with future generations of the South bridge logic. Furthermore, the design of an internal target (such as the IDE IMAX target 155 or USB target 135) is not tied to a specific expansion bus like PCI. Since a common bus target interface is used to couple other devices to the expansion bus, only the bus target interface 185 needs to be modified if the expansion bus protocol is changed or modified. The target IMAX bus 175 preferably is not tri-stated and is always driven.

Referring still to FIG. 2, the DMA controller in the ISA/DMA controller logic 145 preferably provides 24 bits of memory address and 16 bits of byte count for each of 7 DMA channels. The ISA/DMA controller 145 presents an 8-bit interface and thus only is programmed with 8-bit I/O instructions. The ISA/DMA controller 145 supports 8 or 16-bit DMA transfers to memory on the PCI (or other expansion) bus 55. The distributed DMA (DDMA) controller 140 couples to the ISA (or sub-ISA) bus to run programming cycles to the DMA controller inside the ISA/DMA controller 145. When the DMA has control of the ISA bus, the ISA/DMA controller 145 translates the DMA commands into the appropriate bus cycles. As shown in FIG. 2, the ISA/DMA controller 145 operates as both a master and as a slave, and thus couples to both the IMAX master bus 160 and the IMAX target busses 175 and 225.

The distributed DMA controller 140 and re-map engine 120 work in conjunction to process cycles to legacy DMA addresses. The re-map engine 120, illustrated in more detail in FIG. 3, couples to both the IMAX master bus 160 and the IMAX target busses 175 and 225. The South bridge 100 preferably implements a distributed DMA architecture that allows multiple DMA devices to exist on the PCI bus. This architecture separates the DMA controllers into individual channels, allowing them to be distributed between PCI devices. The individual channels, however, must appear to be at a single location for programming purposes. In the preferred embodiment, the DMA architecture separates the I/O address space for each channel into 16-byte blocks referred to as "native" addressing. This 16-byte I/O block can then be mapped anywhere in the 64 kbyte I/O address space. The old and new I/O registers are tied together by the re-map engine 120 that distributes all legacy DMA programming accesses to the associated PCI device on a byte per byte basis. Both South bridge 100 and the South bridge in the expansion base 70 incorporate all seven DMA channels, the re-map engine 120, and the distributed DMA channel interface. Advantageously, the re-map engine 120 of the preferred embodiment spawns only those daughter cycles to the various distributed DMA devices in the computer system that are necessary for proper DMA operation.

To enable distributed DMA service, the PCI target interface 185 preferably enables the re-map engine 120 and the distributed DMA channel interface 140, and also enables and configures the addresses for the distributed DMA channels. When a PCI cycle attempts to access a legacy DMA register, the address decoder 190 positively decodes the cycle and transmits a MATCH signal to the PCI target interface 185. A chip select is given to the re-map engine, which in return, asserts the retry signal to the PCI target interface. The PCI target interface 185 then issues a retry cycle to the PCI master that initiated the cycle. The re-map engine 120 then arbitrates for mastership of the PCI bus 55 through the IMAX master bus protocol. Once the re-map engine 120 receives a mastership grant for the PCI bus, the re-map engine 120 performs ("spawns") daughter cycles to the distributed DMA channels. These cycles are re-run until completed. While the re-map engine 120 is in the process of accessing the distributed channels, any access to a legacy DMA register will result in the issuance of the retry cycle by the PCI target interface 185. The distributed channel data is collected and stored in preparation for the cycle to be executed when retried by the PCI master.

When an access is made to a native DMA register that resides on this South Bridge's ISA bus, the address decoder 190 positively decodes the address. A chip select is given to the distributed DMA controller 140 interface. The address then is translated by the distributed DMA controller to a legacy DMA address and then, the access is transferred to the local ISA bus. Data returned in response to the access is translated from legacy DMA to distributed DMA protocol by the distributed DMA controller 140 before being transferred to the IMAX target outbound data bus 225, and then to the PCI bus 55.

Figure 3:
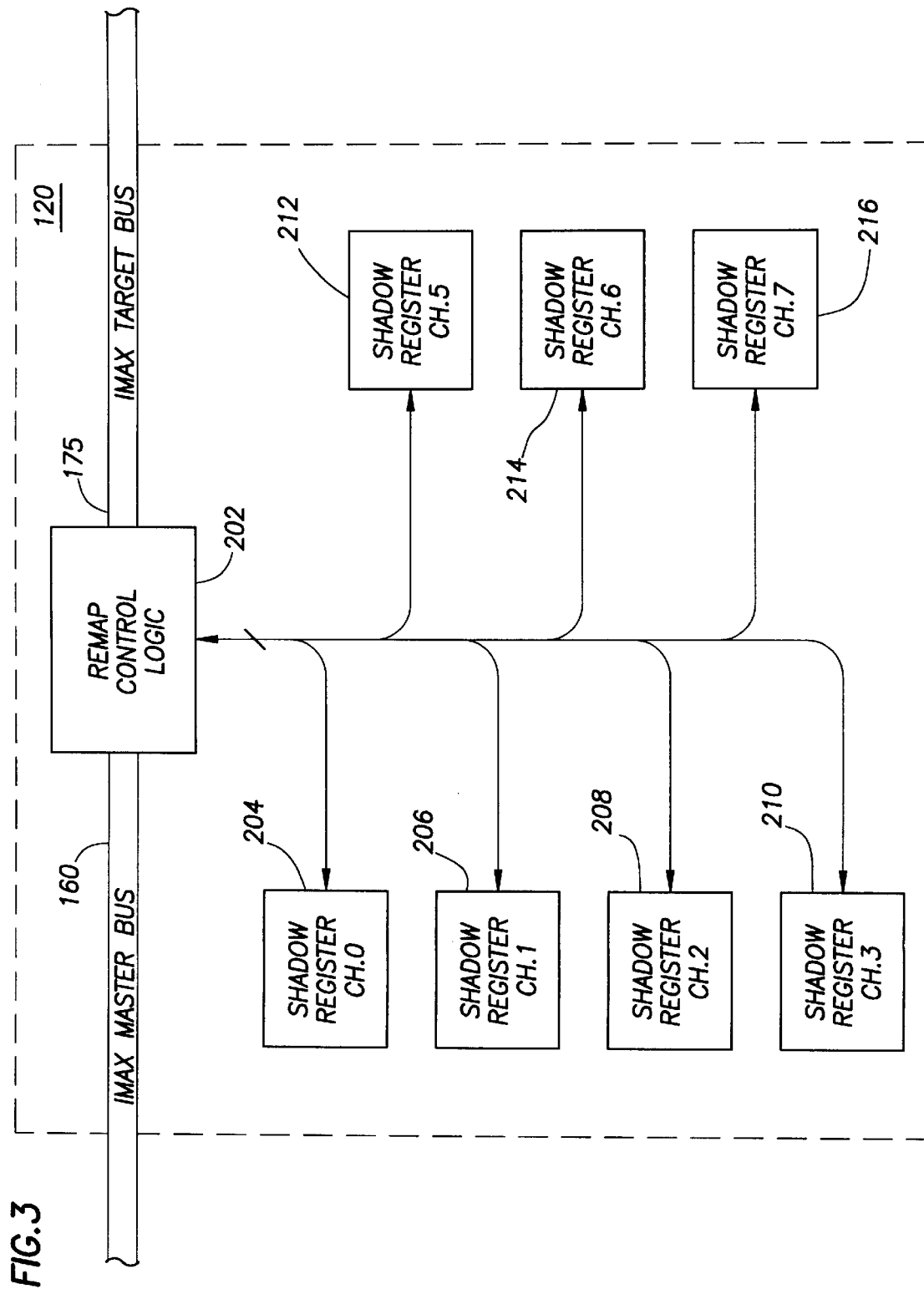
FIG. 3 is a block diagram of the remap engine of FIG. 2.

Referring now to FIG. 3, the re-map engine 120 generally includes re-map control logic 202 coupled to a number of shadow registers. In accordance with the preferred embodiment, re-map engine 120 provides one shadow register for each DMA channel. Accordingly, shadow register 204 is designated for DMA channel 0 and shadow register 206 is designated DMA channel 1. Similarly, shadow registers 208, 210, 212, 214, and 216 are designated for DMA channels 2, 3, 5, 6, and 7, respectively. Re-map engine 120 may not be provided with a shadow register for DMA channel 4 because channel 4 is used for cascading DMA controllers.

Each shadow register preferably includes 16 bytes of native DMA configuration and status information as shown below in Table II. Each shadow register mirrors the current programming data for its associated distributed DMA channel. Thus, shadow register 204 mirrors the current programming data for the distributed channel 0 DMA controller. By reading the shadow registers, the re-map control logic 202 can determine how each distributed channel is currently programmed. The 16 bytes of register configuration and status generally represent well known DMA programming information and thus, are not explained in detail. For a more detailed explanation of what each byte of programming data represents, reference may be made to Appendix A, ISA I/O Addresses included in "ISA System Architecture," Tom Shanley and Don Anderson, MindShare, Inc., Addison-Wesley Publishing Co., $3^{rd}$ edition, 1995, incorporated herein by reference.

TABLE II

Native Distributed DMA Addresses

| Register Name | R/W | Distributed DMA channel address |
|---|---|---|
| Channel's base address 0–7 | W | Base + 0h |
| Channel's current address 0–7 | R | Base + 0h |
| Channel's base address 8–15 | W | Base + 1h |
| Channel's current address 8–15 | R | Base + 1h |
| Channel's base address 16–23 | W | Base + 2h |
| Channel's current address 16–23 | R | Base + 2h |
| Reserved (always return 0's) | R/W | Base + 3h |
| Channel's base word count 0–7 | W | Base + 4h |
| Channel's current word count 0–7 | R | Base + 4h |
| Channel's base word count 8–15 | W | Base + 5h |
| Channel's current word count 8–15 | R | Base + 5h |
| Reserved (always return 0's) | R/W | Base + 6h |
| Extended Mode | N/A | Base + 7h |
| Command | W | Base + 8h |
| Status | R | Base + 8h |
| Request | W | Base + 9h |
| Reserved | N/A | Base + Ah |
| Mode | W | Base + Bh |
| Reserved | W | Base + Ch |
| Master clear | W | Base + Dh |
| Reserved | N/A | Base + Eh |
| Multichannel mask | R/W | Base + Fh |

The re-map control logic 202 responds to a programming cycle as a target device on the IMAX target bus 175. In accordance with the preferred embodiment, the re-map control logic compares the programming data received over the IMAX bus to the contents of the shadow registers 204–216. Generally concurrently, the re-map control logic spawns daughter programming cycles to the various distributed DMA controllers and updates the shadow registers associated with the DMA channels effected by the programming data. For example, if the re-map control logic 202 receives a programming instruction for channel 2, the control logic spawns a programming cycle to distributed DMA channel 2 and updates shadow register 208 so that register 208 reflects the current programming of channel 2.

The present invention takes advantage of the fact that at least several of the legacy programming registers such as the register shown in Table I include bits pertaining to predetermined DMA channels. In accordance with the preferred embodiment, the re-map control logic 202 compares the programming data received over the IMAX target bus 175 to the contents of the shadow register, or registers, effected by the programming cycle. If the programming data does not match the current contents of the shadow register, the re-map control logic determines that the effected distributed DMA channel needs to be reprogrammed and spawns an appropriate daughter cycle to reprogram that channel. On the other hand, if the programming data received over the IMAX target bus matches the contents of the associated shadow register, or registers, then the re-map control logic determines that the associated distributed DMA channel does not need to be reprogrammed. Thus, the re-map control logic first compares the programming data to the shadow registers before spawning daughter programming cycles to the distributed DMA channels. In this way, the re-map control logic only spawns daughter cycles to the distributed DMA channels that are necessary for DMA operation.

By way of example, the CPU 25 may issue a legacy DMA programming cycle to change the mask bit for channel 2. The DMA mask register, illustrated in Table I, is well known to those of ordinary skill in the art as containing mask bits that can be set or reset for multiple DMA channels. Because mask bits for other channels, such as channels 0, 1, and 3, are also included in the legacy mask register, those bits must be programmed as desired. If the CPU only needs to change the mask bit for channel 2, however, the CPU must write to the other bits in the legacy mask register to keep those bits the same. In response, the re-map control logic 202 compares the CPU's DMA legacy programming cycle to the shadow registers and determines that only the mask bit for channel 2 has been changed. Accordingly, the re-map control logic only spawns a daughter cycle to reprogram distributed channel 2, rather than also spawning daughter cycles to reprogram channels 0, 1, and 3.

Additionally, the CPU may reprogram a DMA channel with the identical information as before, but with a different word count value in a legacy base word count register. The re-map engine 202 compares the new programming data to the shadow register for the associated distributed DMA channel and only spawns a daughter programming cycle to change the word count value for that channel. Because the remaining programming information for that channel has not changed, the re-map control logic preferably does not spawn programming cycles for the remaining information, thereby reducing traffic on the PCI bus to program the distributed DMA channels.

Numerous variations and modifications will become apparent to those skilled in the art once the above disclosure is fully appreciated. It is intended that the following claims be interpreted to embrace all such variations and modifications.

What is claimed:

1. A computer system, including:

a CPU;

a memory device coupled to said CPU;

a plurality of distributed DMA controllers; and a bridge device coupling peripheral devices to said memory device, comprising:

a distributed DMA controller; and a re-map engine for receiving master DMA programming cycles from said CPU, comparing said master programming cycles to current programming data for the distributed DMA controllers, and spawning daughter programming cycles to just those distributed DMA controllers for which the master programming cycle does not match the current programming data.

2. The computer system of claim 1, wherein said re-map engine includes a shadow register associated with each distributed DMA controller.

3. The computer system of claim 2, wherein said re-map engine compares a master programming cycle to the contents of said shadow registers and spawns daughter programming cycles to just those distributed DMA controllers for which the master programming cycle does not match the current programming data.

4. The computer system of claim 3, wherein said re-map engine includes 7 shadow registers.

5. The computer system of claim 3 wherein said re-map engine also includes control logic for receiving master programming cycles and comparing said master cycles to the contents of said shadow registers.

6. The computer system of claim 3 wherein said re-map engine concurrently spawns daughter programming cycles to just those distributed DMA controllers for which the master programming cycle does not match the current programming data and updates said shadow registers with new programming data.

7. The computer system of claim 3 wherein each shadow register includes 16 bytes of DMA programming data.

8. The computer system of claim 3 wherein said re-map engine compares each byte of master programming cycle data with a corresponding byte in a shadow register.

9. A bridge device, including:
   a distributed DMA controller; and
   a re-map engine for receiving master DMA programming cycles from a programming device, for comparing said master programming cycles to current programming data for a plurality of distributed DMA controllers, and for spawning daughter programming cycles to just those distributed DMA controllers for which the master programming cycle does not match the current programming data.

10. The bridge device of claim 9, wherein said re-map engine includes a shadow register associated with each distributed DMA controller.

11. The bridge device of claim 10, wherein said re-map engine is adapted to compare a master programming cycle to the contents of said shadow registers and spawns daughter programming cycles to just those distributed DMA controllers for which the master programming cycle does not match the current programming data.

12. The bridge device of claim 11, wherein said re-map engine includes 7 shadow registers.

13. The bridge device of claim 11 wherein said re-map engine also includes control logic for receiving master programming cycles and comparing said master cycles to the contents of said shadow registers.

14. The bridge device of claim 11 wherein said re-map engine concurrently spawns daughter programming cycles to just those distributed DMA controllers for which the master programming cycle does not match the current programming data and updates said shadow registers with new programming data.

15. The bridge device of claim 11 wherein each shadow register includes 16 bytes of DMA programming data.

16. The bridge device of claim 3 wherein said re-map engine compares each byte of master programming cycle data with a corresponding byte in a shadow register.

17. A method for performing distributed DMA, comprising:
   receiving a master DMA programming instruction including programming data;
   comparing said master instruction programming data with current DMA programming data associated with a plurality of distributed DMA channels;
   determining whether a match exists between said master instruction programming data and said current DMA programming data; and
   spawning daughter programming cycles to just those distributed DMA channels for which the result of said determining step is that a mismatch exists between said master programming data and said current programming data.

18. The method of claim 17 wherein said comparing step includes comparing said master programming data to at least one shadow register containing current programming data for a distributed DMA channel.

19. The method of claim 17 wherein said comparing step includes comparing said master programming data to a plurality of shadow registers each shadow register containing current programming data for a different distributed DMA channel.

20. The method of claim 19 wherein said determining step includes determining whether each byte of said master programming data matches corresponding bytes of a shadow register.

21. A bridge device for communicating to distributed DMA controllers, including:
   a remap engine for receiving DMA programming cycles from a programming device, for comparing said master programming cycles to current programming data for a plurality of distributed DMA controllers, and for spawning daughter programming cycles to just those distributed DMA controllers for which the master programming cycle does not match the current programming data.

* * * * *